D. C. GILLILAND.
Cultivator.
No. { 2,984, 33,988. }
Patented Dec. 24, 1861.
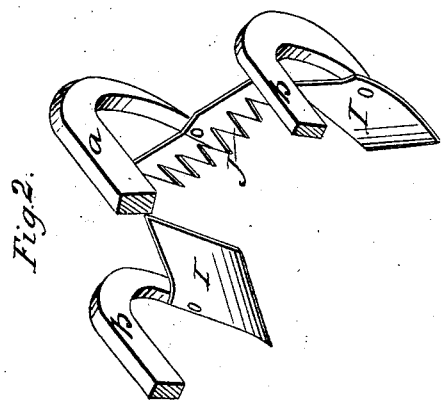
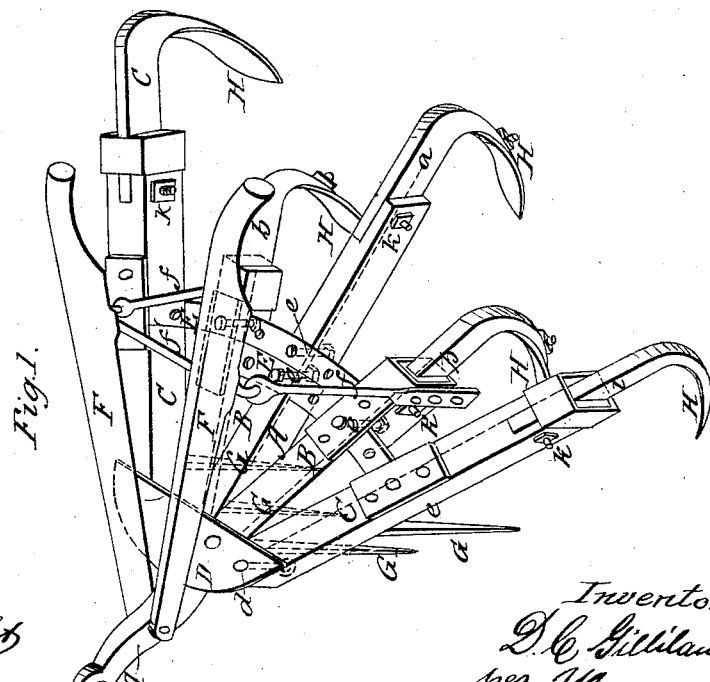

UNITED STATES PATENT OFFICE.

D. C. GILLILAND, OF BROWNSVILLE, OHIO.

IMPROVEMENT IN CULTIVATORS.

Specification forming part of Letters Patent No. 33,988, dated December 24, 1861.

*To all whom it may concern:*

Be it known that I, D. C. GILLILAND, of Brownsville, in the county of Licking and State of Ohio, have invented a new and useful Improvement in Cultivators; and I do hereby declare that the following is a full, clear, and exact description of the same, reference being had to the accompanying drawings, making part of this specification, in which—

Figure 1 is a perspective view of the implement as adapted for the general purposes of a cultivator. Fig. 2 is a perspective view of a portion of the same as employed for covering corn.

Similar letters of reference indicate corresponding parts in both figures.

The subject of this invention is a convertible and adjustable implement adapted to be used for the purposes of a common cultivator, or for covering or hilling up corn, or cultivating between or over the rows of growing crops; and the invention consists in a certain combination and arrangement of parts, hereinafter explained, to accomplish the above objects.

To enable others skilled in the art to make and use my invention, I will proceed to describe its construction and operation.

A is the draft-beam.

B B C C are beams, pivoted in front by vertical holes $d$ to a plate, D, rigidly attached to the beam A.

E E are perforated segments passing through mortises in the beams A, B, and C, and employed in connection with suitable pins or bolts, $e$, and corresponding perforations in the beams, to secure the hinged beams at any required distance from the draft-beam. By this means the implement may be expanded or contracted as needful to suit the work to be performed.

F F are handles, pivoted in front by a horizontal bolt to the draft-beam A, and supported at back by standards $f f$. The said standards are attached adjustably to the beams B B, for the purpose of setting the handles up or down, and hinged to the handles, in order to permit the lateral adjustment of the beams B, as before explained. The handles are held at the required distance apart by a rigid brace-rod, $f'$, which may constitute the means of attachment of the standards $f$. G G are harrow-teeth, one of which depends from the front portion of each of the beams B and C.

$a$, $b$, and $c$ represent shanks secured to the rear ends of the beams A, B, and C, and carrying shares or cultivator-teeth H. The shares $a$ and $b$ are attached by means of screw-bolts, as shown, to permit their removal. The shanks are attached to their beams by screw-bolts $k$, for a like purpose.

In Fig. 2, I I represent mold-boards, and J an oblique rake, which may be substituted for the shares on the shanks $a$ and $b$.

The implement is used as follows: For harrowing in small grain or general cultivation on unplanted ground the parts are arranged as first described and as represented in Fig. 1. For cultivating between rows with a single horse the outer beams, C C, are removed by taking out the bolts $d$ and $e$, which secure them to the plate D and segments E. When it is desired to straddle the row the outer beams, C, are replaced and the shank $a$ is detached, so that nothing depends from the beam A. The said beam will then pass over the young plants without injury thereto. For covering corn the outer beams, C C, may be detached. The shares H are then removed from the shanks $a$ and $b$, and the mold-boards I and rake J substituted therefor. The mold-boards operate to cover the corn, and the oblique rake following removes any clods, rubbish, or other impediments, and leaves the earth in a suitable condition for the growth of the young plant. For hilling up, the mold-boards I are used without the rake J or shank $a$. In every case the implement is expanded or contracted by setting the pivoted beams out or in to suit the requirements of the work, and the handles may be adjusted to any height which the convenience or preference of the operator may dictate.

For marking preparatory to planting, the shanks $a$ and $b$ are all removed, leaving only the outer shares.

What I claim as new, and desire to secure by Letters Patent, is—

The combination of the draft-beam A, hinged beams B and C, removable shanks $a$ $b$ $c$, and detachable shares H, shovels I, and rake J, all constructed, arranged, and employed in the manner and for the purposes herein shown and explained.

D. C. GILLILAND.

Witnesses:
JAMES BROWN,
ALEX. FLOWERS.